(12) United States Patent
Golding

(10) Patent No.: US 11,716,987 B1
(45) Date of Patent: Aug. 8, 2023

(54) DEER STAND CAMOUFLAGE HOLDER

(71) Applicant: Charles Golding, Lowgap, NC (US)

(72) Inventor: Charles Golding, Lowgap, NC (US)

( * ) Notice: Subject to any disclaimer, the term of this patent is extended or adjusted under 35 U.S.C. 154(b) by 78 days.

(21) Appl. No.: 17/462,103

(22) Filed: Aug. 31, 2021

(51) Int. Cl.
*A01M 31/00* (2006.01)
*A01M 31/02* (2006.01)

(52) U.S. Cl.
CPC ................. *A01M 31/025* (2013.01)

(58) Field of Classification Search
CPC .... A01M 31/00; A01M 31/02; A01M 31/025; E04H 15/001; Y10S 135/901
USPC ................................................ 43/1; 135/901
See application file for complete search history.

(56) References Cited

U.S. PATENT DOCUMENTS

| | | | |
|---|---|---|---|
| 4,813,441 A | 3/1989 | Kepley | |
| 5,628,487 A | 5/1997 | Huber | |
| D402,170 S | 12/1998 | Cox | |
| 6,306,471 B1 | 10/2001 | Pitman | |
| 6,543,175 B1 | 4/2003 | Tucker | |
| 7,051,839 B1 | 5/2006 | George | |
| D697,166 S * | 1/2014 | Martinson | ..................... D22/199 |
| 9,185,902 B1 * | 11/2015 | Mazzei, Sr. | ............ F16M 11/14 |
| 9,458,644 B1 * | 10/2016 | Russell | ................... E04H 15/04 |
| 10,412,954 B1 * | 9/2019 | Ellinghuysen | .......... F41A 23/18 |
| 2015/0313206 A1 | 11/2015 | Holland | |
| 2017/0314290 A1 | 11/2017 | Perry | |

FOREIGN PATENT DOCUMENTS

CA 2345913 12/2001

* cited by examiner

*Primary Examiner* — Peter M Poon
*Assistant Examiner* — Danielle A Clerkley
(74) *Attorney, Agent, or Firm* — Kyle A. Fletcher, Esq.

(57) ABSTRACT

The deer stand camouflage holder comprises a tree stand, a camouflage structure, and a tree. The tree stand is a blind used by one or more hunters. The tree stand is an elevated structure. The tree stand attaches to the trunk of a tree. The tree stand is an elevated structure relative to the ground and the targeted game animal. The camouflage structure attaches to the tree stand. The camouflage structure displays tree foliage such that the one or more hunters are camouflaged from the targeted game animal.

13 Claims, 6 Drawing Sheets

DEER STAND CAMOUFLAGE HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hunting blinds. (A01M31/025)

SUMMARY OF INVENTION

The deer stand camouflage holder comprises a tree stand, a camouflage structure, and a tree. The tree stand is a blind used by one or more hunters. The tree stand is an elevated structure. The tree stand attaches to the trunk of a tree. The tree stand is an elevated structure relative to the ground and the targeted game animal. The camouflage structure attaches to the tree stand. The camouflage structure displays tree foliage such that the one or more hunters are camouflaged from the targeted game animal.

These together with additional objects, features and advantages of the deer stand camouflage holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the deer stand camouflage holder in detail, it is to be understood that the deer stand camouflage holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the deer stand camouflage holder.

It is therefore important that the claims be regarded as including such equivalent construction insofar as they do not depart from the spirit and scope of the deer stand camouflage holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
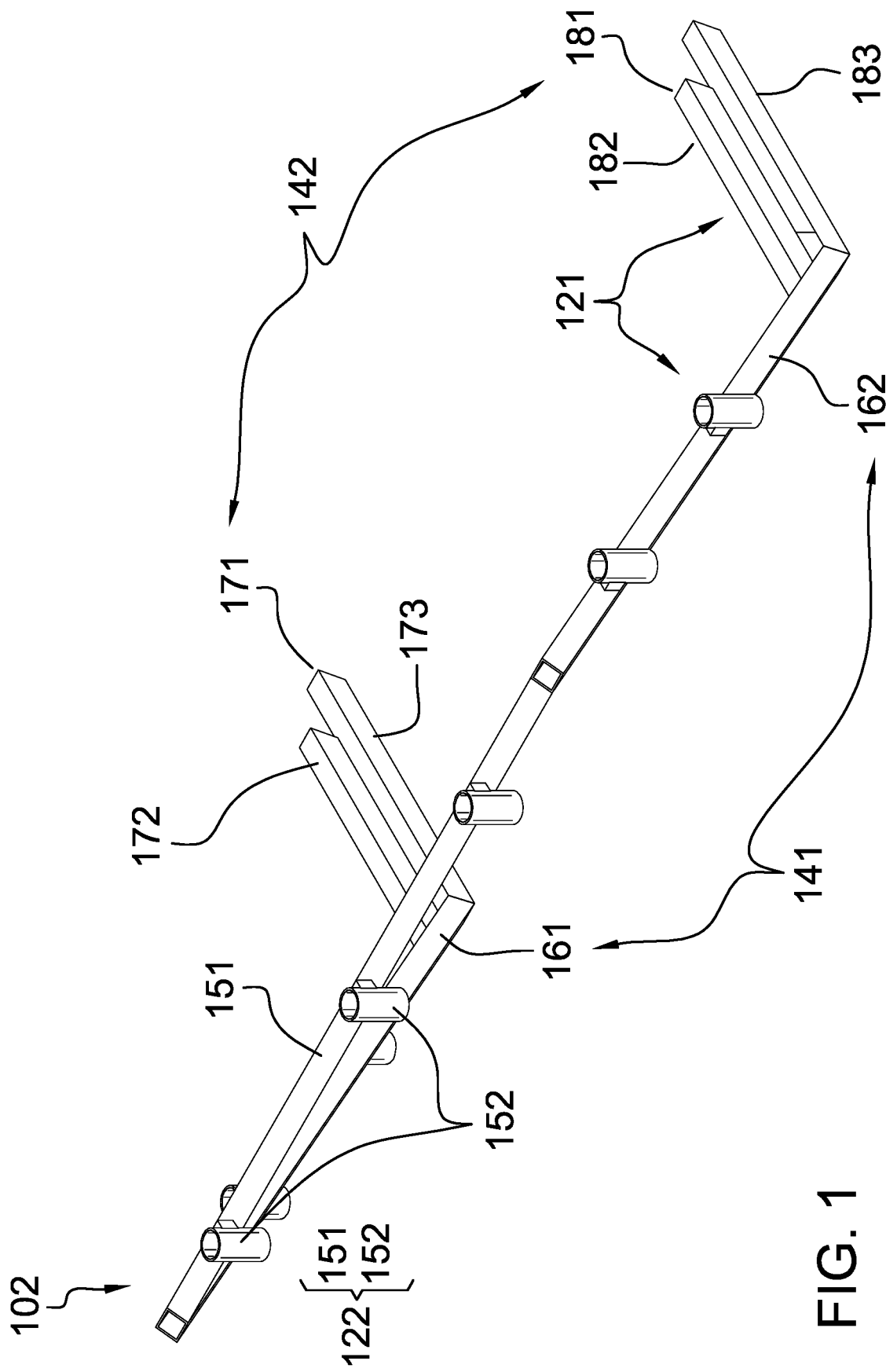
FIG. 1 is a perspective view of an embodiment of the disclosure.
Figure 2:
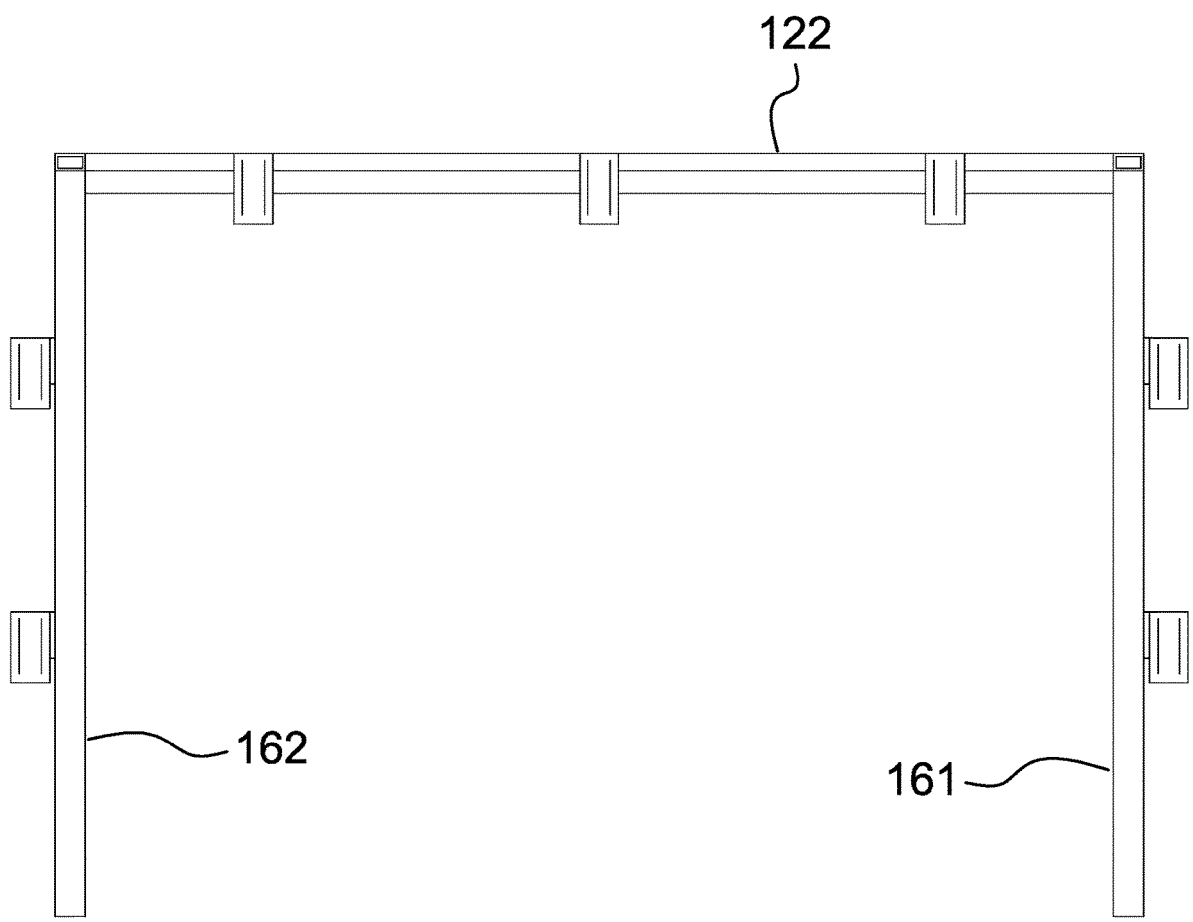
FIG. 2 is a front view of an embodiment of the disclosure.
Figure 3:
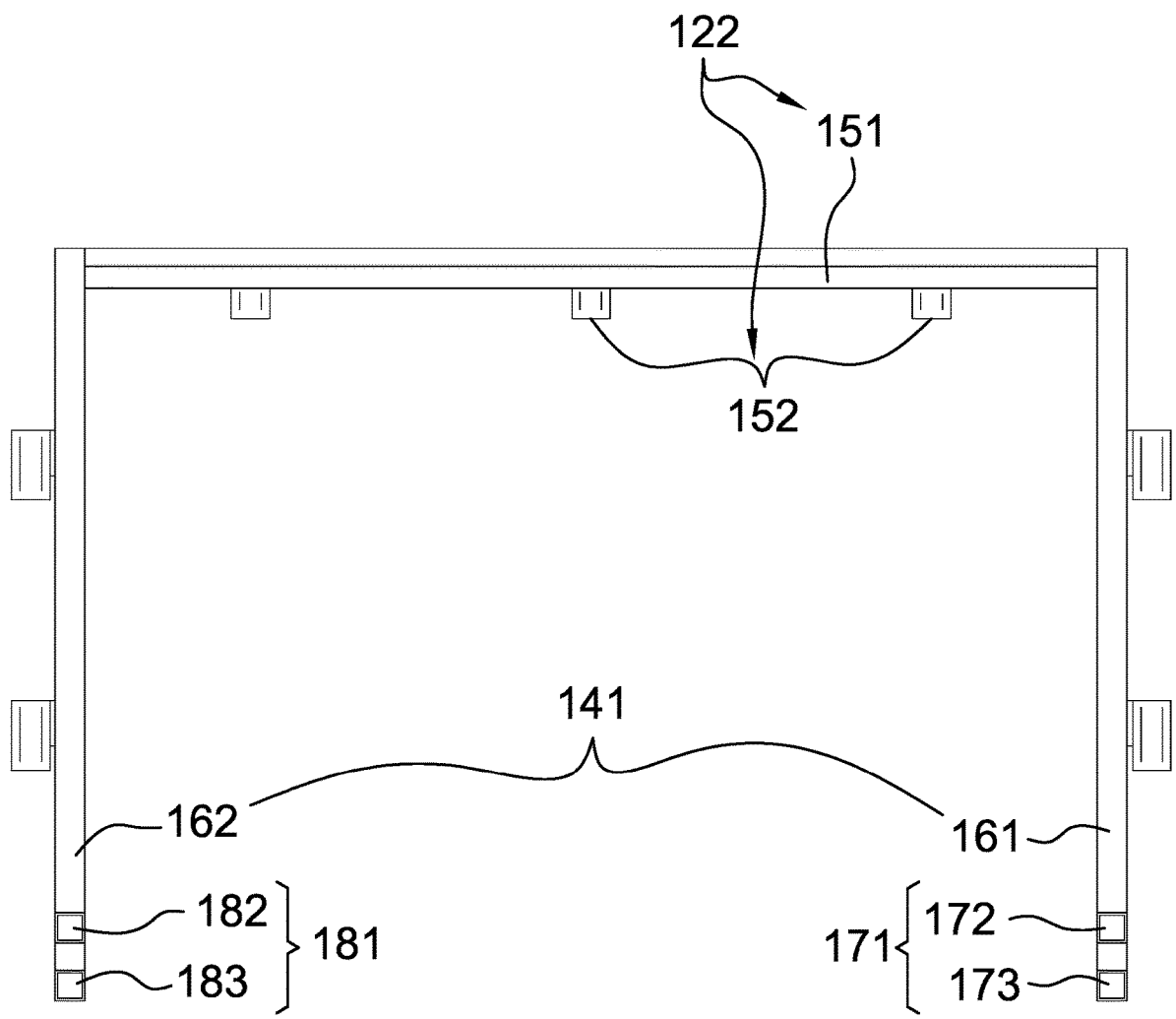
FIG. 3 is a rear view of an embodiment of the disclosure.
Figure 4:
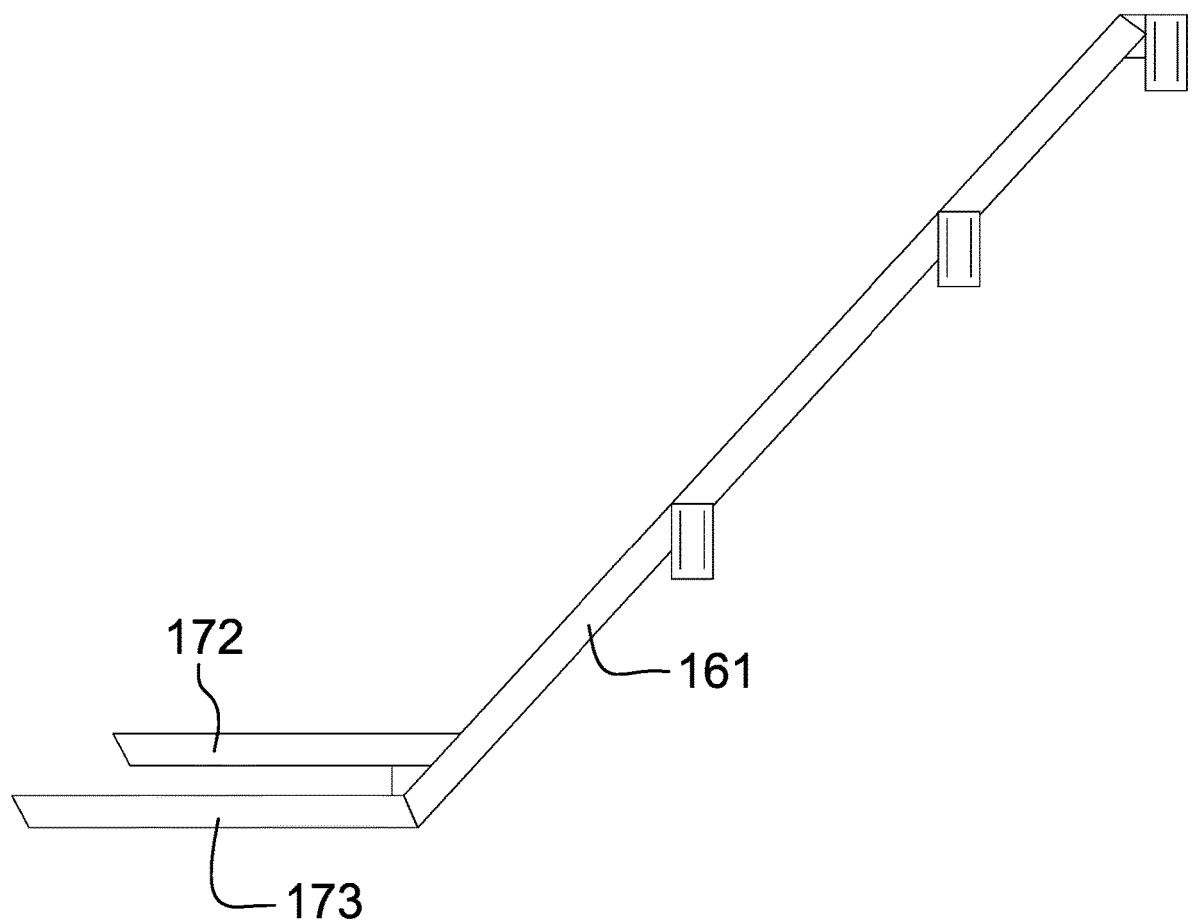
FIG. 4 is a side view of an embodiment of the disclosure.
Figure 5:
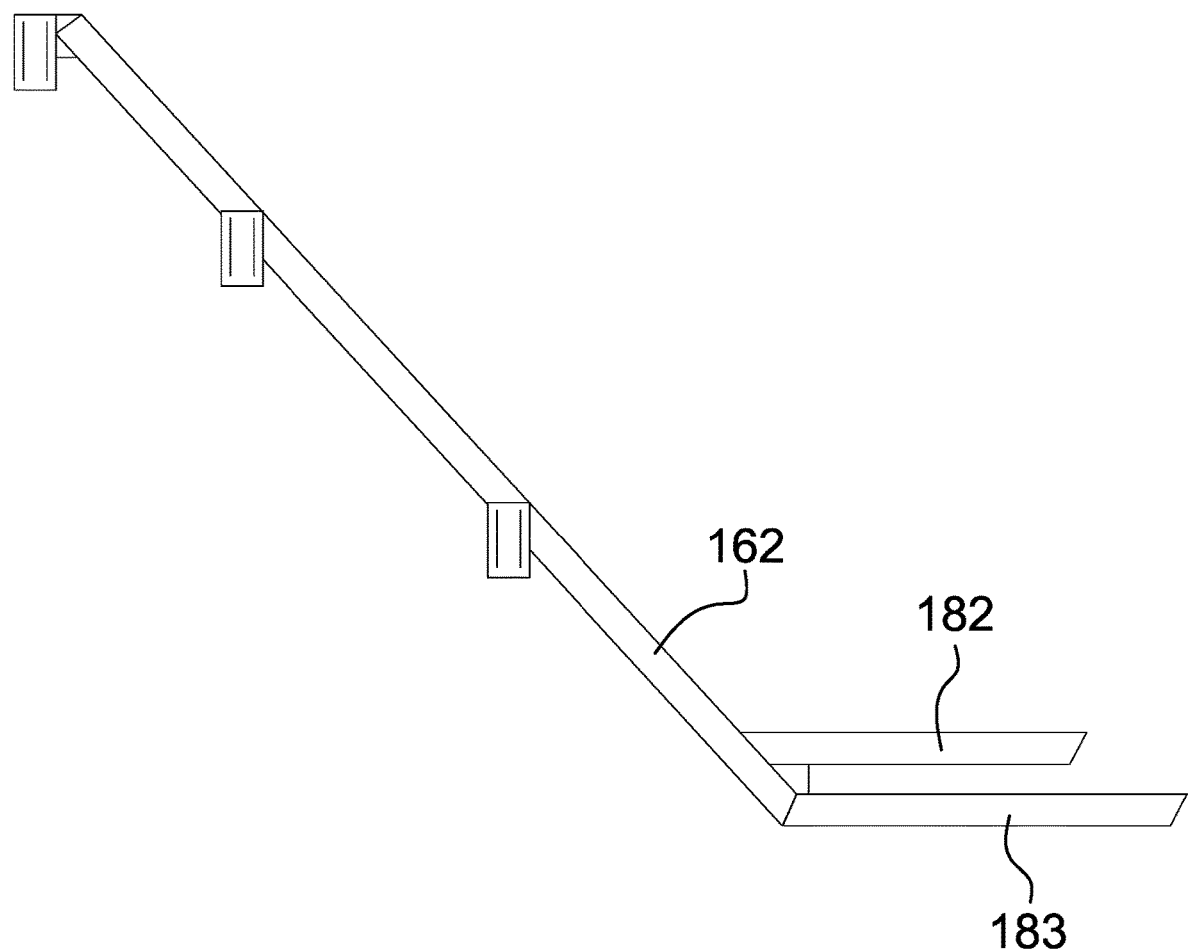
FIG. 5 is a side view of an embodiment of the disclosure.
Figure 6:
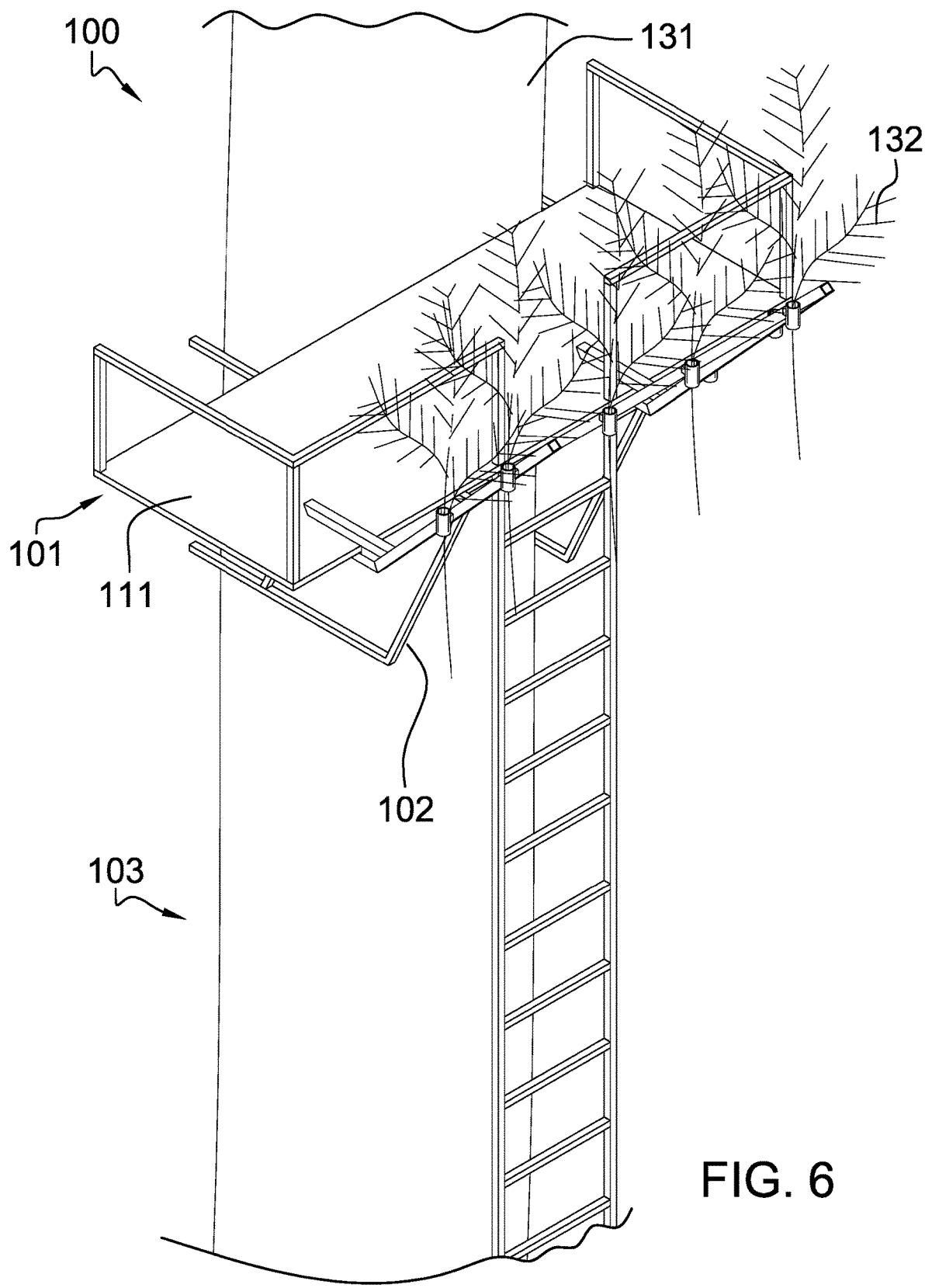
FIG. 6 is an in-use view of an embodiment of the disclosure.

Detailed reference will now be made to one or more potential embodiments of the disclosure, which are illustrated in FIGS. 1 through 6.

The deer stand camouflage holder 100 (hereinafter invention) comprises a tree stand 101, a camouflage structure 102, and a tree. The tree stand 101 is a blind used by one or more hunters. The tree stand 101 is an elevated structure. The tree stand 101 attaches to the trunk 131 of a tree. The tree stand 101 is an elevated structure relative to the ground and the targeted game animal. The camouflage structure 102 attaches to the tree stand 101. The camouflage structure 102 displays tree 103 foliage 132 such that the one or more hunters are camouflaged from the targeted game animal.

The tree 103 is a plant. The tree 103 forms a supporting structure that elevates the tree stand 101 above the ground. The tree 103 further comprises a trunk 131 and foliage 132. The tree stand 101 attaches to the trunk 131 of the tree 103. The trunk 131 of the tree 103 is defined elsewhere in this disclosure. The foliage 132 of the is defined elsewhere in this disclosure.

The tree stand 101 attaches to the tree 103. The tree stand 101 is a horizontally oriented platform. The tree stand 101 attaches to the tree 103 such that the horizontally oriented platform is elevated above the ground. The tree stand 101 elevates one or more hunters above the ground. The tree stand 101 comprises a supporting platform 111. The supporting platform 111 attaches to the trunk 131 of the tree such that the supporting platform 111 is elevated above the ground.

The supporting platform 111 is a horizontally oriented platform. The supporting platform 111 attaches to the trunk 131 of the tree 103. The supporting platform 111 forms an elevated structure relative to the ground supporting the targeted game animal. The supporting platform 111 elevates one or more hunters above the ground. The supporting platform 111 forms the load path that transfers the load of the one or more hunters to the trunk 131 of the tree 103.

The camouflage structure 102 is a mechanical structure. The camouflage structure 102 mounts on the supporting platform 111 of the tree stand 101. The foliage 132 of the tree 103 mounts on the camouflage structure 102 to camouflage the one or more hunters from the targeted game animal. The camouflage structure 102 forms the load path that transfers the load of the foliage 132 to the tree stand 101. The camouflage structure 102 attaches to the supporting platform 111. The foliage 132 of the tree 103 attaches to the camouflage structure 102 such that the foliage 132 forms a blind that camouflages the one or more hunters from the targeted game animal. The foliage 132 is cut from the tree 103 before attaching to the camouflage structure 102. The camouflage structure 102 comprises a riser structure 121 and a camouflage support structure 122.

The riser structure 121 is a mechanical structure. The riser structure 121 attaches the camouflage support structure 122 to the supporting platform 111 of the tree stand 101. The riser structure 121 is a load bearing structure that transfers the load of the camouflage support structure 122 and the foliage 132 to the supporting platform 111. The riser structure 121 forms a cant that elevates the camouflage support structure 122 above the supporting surface formed by the supporting platform 111. The riser structure 121 removably attaches to the supporting platform 111. The riser structure 121 permanently attaches to the camouflage support structure 122. The riser structure 121 comprises a plurality of gussets 141 and a plurality of support brackets 142.

Each of the plurality of gussets 141 is a prism shaped structure. Each of the plurality of gussets 141 is a rigid structure. Each of the plurality of gussets 141 forms an extension structure that extends the reach between a support bracket selected from the plurality of support brackets 142 and the camouflage support structure 122. Each of the plurality of gussets 141 forms a cant relative to the force of gravity such that the plurality of gussets 141 elevates the camouflage support structure 122 above the supporting platform 111 of the tree stand 101. The plurality of gussets 141 comprises a first gusset 161 and a second gusset 162.

The first gusset 161 is a prism shaped structure. The first gusset 161 is a rigid structure. The first gusset 161 attaches to a support bracket selected from the plurality of support brackets 142. The first gusset 161 attaches to the selected support bracket such that the first gusset 161 projects away from the selected support bracket in the manner of a cantilever. The first gusset 161 projects away from the selected support bracket such that the center axis of the selected support bracket forms a cant with the force of gravity. The cant formed by the first gusset 161 elevates the crossbeam 151 above the supporting platform 111 of the tree stand 101. The free end of the first gusset 161 physically attaches to a congruent end of the crossbeam 151.

The second gusset 162 is a prism shaped structure. The second gusset 162 is a rigid structure. The second gusset 162 attaches to a support bracket selected from the plurality of support brackets 142. The second gusset 162 attaches to the selected support bracket such that the second gusset 162 projects away from the selected support bracket in the manner of a cantilever. The second gusset 162 projects away from the selected support bracket such that the center axis of the selected support bracket forms a cant with the force of gravity. The cant formed by the second gusset 162 elevates the crossbeam 151 above the supporting platform 111 of the tree stand 101. The free end of the second gusset 162 physically attaches to a congruent end of the crossbeam 151.

Each of the plurality of support brackets 142 is a mechanical structure. Each of the plurality of support brackets 142 is a rigid structure. Each of the plurality of support brackets 142 attaches to a gusset selected from the plurality of gussets 141. Each of the plurality of support brackets 142 removably attaches to the supporting platform 111 of the tree stand 101. Each supporting bracket selected from the plurality of support brackets 142 is sized such that the supporting platform 111 physically inserts into the selected supporting bracket. Each of the plurality of support brackets 142 forms a link of the load path that transfers the loads of the camouflage structure 102 and the foliage 132 to the tree stand 101. The plurality of support brackets 142 comprises a first support bracket 171 and a second support bracket 181.

The first support bracket 171 is a mechanical structure. The first support bracket 171 is a rigid structure. The first support bracket 171 is a fastening device. The first support bracket 171 attaches to the fixed end of the cantilever structure of the first gusset 161. The first support bracket 171 removably attaches the first gusset 161 to the supporting platform 111 of the tree 403 stand 101. The first support bracket 171 attaches to the tree 103 by inserting the supporting platform 111 into the first support bracket 171. The first support bracket 171 comprises a first superior support beam 172 and a first inferior support beam 173.

The first superior support beam 172 is a prism shaped structure. The first superior support beam 172 is a rigid structure. A congruent end of the first superior support beam 172 attaches to the lateral face of the prism structure of the first gusset 161 such that a cant is formed between the center axis of the first superior support beam 172 and the center axis of the first gusset 161.

The first inferior support beam 173 is a prism shaped structure. The first inferior support beam 173 is a rigid structure. A congruent end of the first inferior support beam 173 attaches to the lateral face of the prism structure of the first gusset 161 such that a cant is formed between the center axis of the first inferior support beam 173 and the center axis of the first gusset 161. The arc of the cant formed between the first inferior support beam 173 and the first gusset 161 equals the arc of the cant formed between the first superior support beam 172 and the first gusset 161.

The span of the distance between the first superior support beam 172 and the first inferior support beam 173 is sized such that the supporting platform 111 of the tree stand 101 will fit between the first superior support beam 172 and the first inferior support beam 173. The supporting platform 111 inserts into the first support bracket 171 such that the first superior support beam 172 is proximal to the superior surface of the supporting platform 111. The supporting platform 111 inserts into the first support bracket 171 such that the first inferior support beam 173 is proximal to the inferior surface of the supporting platform 111.

The second support bracket 181 is a mechanical structure. The second support bracket 181 is a rigid structure. The second support bracket 181 is a fastening device. The second support bracket 181 attaches to the fixed end of the cantilever structure of the second gusset 162. The second support bracket 181 removably attaches the second gusset 162 to the supporting platform 111 of the tree stand 101. The second support bracket 181 attaches to the tree by inserting the supporting platform 111 into the second support bracket 181. The second support bracket 181 comprises a second superior support beam 182 and a second inferior support beam 183.

The second superior support beam 182 is a prism shaped structure. The second superior support beam 182 is a rigid structure. A congruent end of the second superior support beam 182 attaches to the lateral face of the prism structure of the second gusset 162 such that a cant is formed between the center axis of the second superior support beam 182 and the center axis of the second gusset 162.

The second inferior support beam 183 is a prism shaped structure. The second inferior support beam 183 is a rigid structure. A congruent end of the second inferior support beam 183 attaches to the lateral face of the prism structure of the second gusset 162 such that a cant is formed between the center axis of the second inferior support beam 183 and the center axis of the second gusset 162. The arc of the cant formed between the second inferior support beam 183 and the second gusset 162 equals the arc of the cant formed between the second superior support beam 182 and the second gusset 162.

The span of the distance between the second superior support beam 182 and the second inferior support beam 183 is sized such that the supporting platform 111 of the tree stand 101 will fit between the second superior support beam 182 and the second inferior support beam 183. The supporting platform 111 inserts into the second support bracket 181 such that the second superior support beam 182 is proximal to the superior surface of the supporting platform 111. The supporting platform 111 inserts into the second support bracket 181 such that the second inferior support beam 183 is proximal to the inferior surface of the supporting platform 111.

The camouflage support structure 122 is a mechanical structure. The camouflage support structure 122 attaches the foliage 132 to the riser structure 121 to form the blind that conceals the one or more hunters from the targeted game animal. The camouflage support structure 122 forms a bracing structure that braces the first gusset 161 of the riser structure 121 to the second gusset 162 of the riser structure 121. The bracing structure formed by the camouflage support structure 122 shares any transient forces borne the riser structure 121 between the first gusset 161 and the second gusset 162. The camouflage support structure 122 comprises a crossbeam 151 and a plurality of foliage 132 receiving pipes 152.

The crossbeam 151 is a prism shaped structure. The crossbeam 151 is a rigid structure. The crossbeam 151 forms the bracing structure of the camouflage structure 102. A first congruent end of the crossbeam 151 attaches to the free end of the first gusset 161. A second congruent end of the crossbeam 151 attaches the free end of the second gusset 162.

Each of the plurality of foliage 132 receiving pipes 152 is a prism shaped structure. Each of the plurality of foliage 132 receiving pipes 152 is a pipe. The inner diameter of each of the plurality of foliage 132 receiving pipes 152 is sized such that foliage 132 can be inserted into any receiving pipe selected from the plurality of foliage 132 receiving pipes 152. The lateral face of the prism structure of each of the plurality of foliage 132 receiving pipes 152 attaches to the lateral face of the prism structure of the crossbeam 151. Each receiving pipe selected from the plurality of foliage 132 receiving pipes 152 attaches to the crossbeam 151 such that the center axis of the selected receiving pipe is perpendicular to the center axis of the crossbeam 151.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Beam: As used in this disclosure, a beam is a horizontally oriented shaft that: 1) is suspended above a supporting surface; and, 2) bears a load.

Blind: As used in this disclosure, a blind is a structure that is used to conceal a person or an object.

Brace: As used in this disclosure, a brace is a structural element that is used to support, stabilize, or otherwise steady an object.

Camouflage: As used in this disclosure, camouflage refers to a visual pattern and form that is applied to an object. The visual pattern and form are intended to cause the object to blend into the environment surrounding the object. In this scenario, the camouflage disguises the object by making the object difficult to see while the object is in the environment.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Game Animal: As used in this disclosure, a game animal is an animal that is targeted by a hunter or fisherperson during hunting or fishing activities.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity.

Gusset: As used in this disclosure, a gusset is an angled structural member used to form a portion of the load path of section of a framework. By angled is meant that the gusset is neither parallel nor perpendicular to the force of gravity.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hunt: As used in this disclosure, to hunt means to pursue and kill an animal for sport, food, or animal control purposes.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Pipe: As used in this disclosure, the term pipe is used to describe a rigid hollow prism. While pipes that are suitable for use in this disclosure are often used to transport or conveys fluids or gases, the purpose of the pipes in this disclosure are structural. In this disclosure, the terms inner dimension of a pipe and outer dimension are used as they would be used by those skilled in the plumbing arts would use inner diameter and outer diameter.

Plant: As used in this disclosure, a plant is a biological organism: 1) that is not capable of movement over significant distances; and 2) that uses photosynthesis to create nutrients. The structure of the plant where photosynthesis occurs is called the leaf. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant. As used in this disclosure, the term foliage refers to the leaves and branches of a plant. The trunk of a plant refers to the portion of a plant that forms the biological connections between the roots of the plant and the foliage of the plant. The roots of the plant refer to the biological subsystem of the plant that draws nutrients into the plant through the soil.

Platform: As used in this disclosure, a platform is a raised horizontal surface that forms a load path to support objects placed on the superior surface of the platform.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred.

This disclosure assumes that an object placed on the supporting surface is in an orientation that is appropriate for the normal or anticipated use of the object.

U-Shaped Structure: As used in this disclosure, a U-shaped structure refers to a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A deer stand camouflage holder comprising
a tree stand configured to attach to a trunk of a tree, and a camouflage structure;
wherein the camouflage structure attaches to the tree stand;
wherein the camouflage structure comprises a riser structure and a camouflage support structure;
wherein the riser structure attaches the camouflage support structure to a supporting platform of the tree stand;
wherein the riser structure comprises a plurality of gussets and a plurality of support brackets;
wherein each of the plurality of support brackets attaches to a gusset selected from the plurality of gussets;
wherein each of the plurality of support brackets removably attaches to the supporting platform of the tree stand;
wherein the plurality of gussets comprises a first gusset and a second gusset;
wherein the first gusset attaches to a support bracket selected from the plurality of support brackets;
wherein a cant formed by the first gusset elevates a crossbeam above the supporting platform of the tree stand;
wherein the second gusset attaches to a support bracket selected from the plurality of support brackets;
wherein a cant formed by the second gusset elevates the crossbeam above the supporting platform of the tree stand.

2. The deer stand camouflage holder according to claim 1
wherein the tree stand is a blind;
wherein the tree stand is an elevated structure;
wherein the tree is a plant;
wherein the tree further comprises a trunk and foliage;
wherein the tree stand attaches to the trunk of the tree;
wherein the camouflage structure displays tree foliage.

3. The deer stand camouflage holder according to claim 2
wherein the supporting platform of the tree stand is a horizontally oriented platform;
wherein the supporting platform of the tree stand attaches to the trunk of the tree such that the supporting platform of the tree stand is elevated above the ground.

4. The deer stand camouflage holder according to claim 3
wherein the camouflage structure is a mechanical structure;
wherein the camouflage structure mounts on the supporting platform of the tree stand;
wherein the foliage of the tree mounts on the camouflage structure;
wherein the camouflage structure forms a load path that transfers a load of the foliage to the tree stand.

5. The deer stand camouflage holder according to claim 4
wherein the riser structure is a mechanical structure;
wherein the riser structure is a load bearing structure that transfers the load of the camouflage support structure and the foliage to the supporting platform;
wherein the riser structure forms a cant that elevates the camouflage support structure above a supporting surface formed by the supporting platform;
wherein the riser structure removably attaches to the supporting platform;
wherein the riser structure permanently attaches to the camouflage support structure.

6. The deer stand camouflage holder according to claim 5
wherein each of the plurality of gussets is a prism shaped structure;
wherein each of the plurality of gussets is a rigid structure;
wherein each of the plurality of gussets forms an extension structure that extends a reach between a support bracket selected from the plurality of support brackets and the camouflage support structure;
wherein each of the plurality of gussets forms a cant relative to the force of gravity such that the plurality of gussets elevates the camouflage support structure above the supporting platform of the tree stand.

7. The deer stand camouflage holder according to claim 6
wherein the first gusset is a prism shaped structure;
wherein the first gusset is a rigid structure;
wherein the first gusset attaches to the selected support bracket such that the first gusset projects away from the selected support bracket in the manner of a cantilever;
wherein the first gusset projects away from the selected support bracket such that a center axis of the selected support bracket forms a cant with the force of gravity;
wherein the second gusset is a prism shaped structure;
wherein the second gusset is a rigid structure;
wherein the second gusset attaches to the selected support bracket such that the second gusset projects away from the selected support bracket in the manner of a cantilever;
wherein the second gusset projects away from the selected support bracket such that the center axis of the selected support bracket forms a cant with the force of gravity.

8. The deer stand camouflage holder according to claim 7
wherein each of the plurality of support brackets is a mechanical structure;
wherein each of the plurality of support brackets is a rigid structure;
wherein each support bracket selected from the plurality of support brackets is sized such that the supporting platform physically inserts into the selected support bracket;
wherein each of the plurality of support brackets forms a link of the load path that transfers a load of the camouflage structure and the foliage to the tree stand.

9. The deer stand camouflage holder according to claim 8
wherein the plurality of support brackets comprises a first support bracket and a second support bracket;
wherein the first support bracket is a mechanical structure;
wherein the first support bracket is a rigid structure;
wherein the first support bracket is a fastening device;
wherein the first support bracket attaches to a fixed end of the cantilever structure of the first gusset;
wherein the first support bracket removably attaches the first gusset to the supporting platform of the tree stand;
wherein the first support bracket attaches to the tree by inserting the supporting platform into the first support bracket;
wherein the second support bracket is a mechanical structure;
wherein the second support bracket is a rigid structure;
wherein the second support bracket is a fastening device;
wherein the second support bracket attaches to a fixed end of the cantilever structure of the second gusset;
wherein the second support bracket removably attaches the second gusset to the supporting platform of the tree stand;
wherein the second support bracket attaches to the tree by inserting the supporting platform into the second support bracket.

10. The deer stand camouflage holder according to claim 9
wherein the camouflage support structure is a mechanical structure;
wherein the camouflage support structure attaches the foliage to the riser structure to form the blind that conceals one or more hunters from a targeted game animal;
wherein the camouflage support structure forms a bracing structure that braces the first gusset of the riser structure to the second gusset of the riser structure;
wherein the bracing structure formed by the camouflage support structure shares any transient forces between the first gusset and the second gusset.

11. The deer stand camouflage holder according to claim 10
wherein the camouflage support structure comprises a crossbeam and a plurality of foliage receiving pipes;
wherein the crossbeam is a prism shaped structure;
wherein the crossbeam is a rigid structure;
wherein the crossbeam forms the bracing structure of the camouflage structure;
wherein a first congruent end of the crossbeam attaches to a free end of the first gusset;
wherein a second congruent end of the crossbeam attaches a free end of the second gusset;
wherein each of the plurality of foliage receiving pipes is a prism shaped structure;
wherein each of the plurality of foliage receiving pipes is a pipe;
wherein an inner diameter of each of the plurality of foliage receiving pipes is sized such that foliage can be inserted into any receiving pipe selected from the plurality of foliage receiving pipes;
wherein a lateral face of the prism structure of each of the plurality of foliage receiving pipes attaches to the lateral face of the prism structure of the crossbeam;
wherein each receiving pipe selected from the plurality of foliage receiving pipes attaches to the crossbeam such that a center axis of the selected receiving pipe is perpendicular to a center axis of the crossbeam.

12. The deer stand camouflage holder according to claim 11 wherein the first support bracket comprises a first superior support beam and a first inferior support beam;

wherein the first superior support beam is a prism shaped structure;

wherein the first superior support beam is a rigid structure;

wherein a congruent end of the first superior support beam attaches to a lateral face of the prism structure of the first gusset such that a cant is formed between a center axis of the first superior support beam and a center axis of the first gusset;

wherein the first inferior support beam is a prism shaped structure;

wherein the first inferior support beam is a rigid structure;

wherein a congruent end of the first inferior support beam attaches to a lateral face of the prism structure of the first gusset such that a cant is formed between a center axis of the first inferior support beam and a center axis of the first gusset;

wherein an arc of the cant formed between the first inferior support beam and the first gusset equals an arc of the cant formed between the first superior support beam and the first gusset;

wherein a span of a distance between the first superior support beam and the first inferior support beam is sized such that the supporting platform of the tree stand will fit between the first superior support beam and the first inferior support beam;

wherein the supporting platform inserts into the first support bracket such that the first superior support beam is proximal to a superior surface of the supporting platform;

wherein the supporting platform inserts into the first support bracket such that the first inferior support beam is proximal to an inferior surface of the supporting platform.

13. The deer stand camouflage holder according to claim 12 wherein the second support bracket comprises a second superior support beam and a second inferior support beam;

wherein the second superior support beam is a prism shaped structure;

wherein the second superior support beam is a rigid structure;

wherein a congruent end of the second superior support beam attaches to a lateral face of the prism structure of the second gusset such that a cant is formed between a center axis of the second superior support beam and a center axis of the second gusset;

wherein the second inferior support beam is a prism shaped structure;

wherein the second inferior support beam is a rigid structure;

wherein a congruent end of the second inferior support beam attaches to the lateral face of the prism structure of the second gusset such that a cant is formed between the center axis of the second inferior support beam and the center axis of the second gusset;

wherein an arc of the cant formed between the second inferior support beam and the second gusset equals an arc of the cant formed between the second superior support beam and the second gusset;

wherein a span of the distance between the second superior support beam and the second inferior support beam is sized such that the supporting platform of the tree stand will fit between the second superior support beam and the second inferior support beam;

wherein the supporting platform inserts into the second support bracket such that the second superior support beam is proximal to a superior surface of the supporting platform;

wherein the supporting platform inserts into the second support bracket such that the second inferior support beam is proximal to an inferior surface of the supporting platform.

\* \* \* \* \*